United States Patent [19]
Ohba et al.

[11] Patent Number: 5,224,048
[45] Date of Patent: Jun. 29, 1993

[54] ELECTRIC DISCHARGE MACHINE INCLUDING ELECTRODE CONFIGURATION SENSOR

[75] Inventors: Nobuaki Ohba; Toshiro Ohizumi; Hidehiko Tanaka, all of Aichi, Japan

[73] Assignee: Mitsubishi Denki K.K., Tokyo, Japan

[21] Appl. No.: 574,032

[22] Filed: Aug. 29, 1990

[30] Foreign Application Priority Data

Sep. 20, 1989 [JP] Japan .................. 1-241679
Jun. 4, 1990 [JP] Japan .................. 2-144504

[51] Int. Cl.⁵ .................. G06F 15/46; B23H 7/06
[52] U.S. Cl. .................. 364/474.04; 219/69.13; 219/69.19; 364/474.15; 364/474.17
[58] Field of Search .................. 364/474.04, 474.01, 364/474.02, 474.12, 474.15, 474.16, 474.17, 474.21; 219/69.11, 69.12, 69.13, 69.15, 69.16, 69.17, 69.19

[56] References Cited

U.S. PATENT DOCUMENTS

| | | | |
|---|---|---|---|
| 3,987,269 | 10/1976 | Inoue et al. | 219/69.17 |
| 4,441,004 | 4/1984 | Inoue | 219/69.17 X |
| 4,504,722 | 3/1985 | Kishi et al. | 219/69.13 X |
| 4,527,729 | 7/1985 | Inoue | 219/69.17 X |
| 4,559,434 | 12/1985 | Kinoshita | 219/69.17 |
| 4,675,825 | 6/1987 | Dementhon | 364/474.04 |

FOREIGN PATENT DOCUMENTS 2223284 11/1972 Fed. Rep. of Germany .................. 364/474.04

Primary Examiner—Joseph Ruggiero
Attorney, Agent, or Firm—Sughrue, Mion, Zinn, Macpeak & Seas

[57] ABSTRACT

An improved electric discharge machine with a numerical control unit includes an electrode configuration sensor in a machining vessel for detecting the configuration of a machining electrode before an electric discharge machining operation is conducted. According to one aspect of the invention, the electric discharge machining operation is performed while electrical discharge machining conditions are being automatically selected so as to permit the most suitable machining conditions for the electric discharge machining operation to be carried out with respect to the electrode whose configuration has been detected. According to another aspect of the invention, troublesome operations for setting the electrical conditions corresponding to the electrical discharge machining operation are eliminated.

4 Claims, 4 Drawing Sheets

ELECTRIC DISCHARGE MACHINE INCLUDING ELECTRODE CONFIGURATION SENSOR

BACKGROUND OF THE INVENTION

This invention relates to electric discharge machines, and more particularly to automation of an electric discharge machine.

A conventional electric discharge machine is organized as shown in FIG. 5.

In FIG. 5, reference numeral 1 designates an electric discharge machining electrode; 2, a workpiece to be machined; 3, a machining vessel; and 4, a machining solution such as insulating oil in the machining vessel 3. Using the electric discharge machine, various machining operations are carried out with the workpiece 2 immersed in the machining solution in the machining vessel 3. With respect to FIG. 5, reference numeral 5 designates a pulse current generating unit for supplying an electric discharge pulse current to the electrode 1 and the workpiece 2; 8a indicates a ball screw for moving the main shaft of the electric discharge machine vertically (in a direction of Z-axis); 8c shows a ball screw for moving the workpiece 2 right and left (in a direction of X-axis); 9a indicates a servo motor for driving the ball screw 8a; 9b indicates a servo motor for driving a ball screw (not shown) which is adapted to move the workpiece 1 back and force (in a direction of Y-axis); 9c designates a servo motor for driving the ball screw 8c; and 10 designates a numerical control unit for suitably controlling the servo motors 9a, 9b and 9c according to a machining program. References numeral 11 designates a head member forming the upper portion of the electric discharge machine; 12 indicates a column which is a frame fixedly supporting the head member 11; 13 indicates a bed on which the electric discharge machine is installed; 14b indicates a movable table for moving the workpiece 2 and the machining vessel 3 back and forth (along the Y-axis); 14c, denotes a movable table for moving the workpiece 2 and the machining vessel 3 right and left (along the X-axis); 15, indicates a machining head mounted on the main shaft of the electric discharge machine; 16 designates an electrode exchanging unit for exchanging the electrode 1 on the main shaft; 17 denotes an arm for gripping an electrode during an electrode exchanging operation; and 18 indicates a magazine rack which accommodates a variety of tools such as electrodes 1.

The conventional electric discharge machine thus constructed operates as follows.

The electrode 1 and the workpiece 2 are confronted with each other while being held immersed in the machining solution in the machining vessel 3. Under this condition, a pulse current caused to flow between the electrode 1 and the workpiece 2 by the pulse current generating unit 5. As a result, electric discharge takes place between the electrode 1 and the workpiece 2 intermittently, thus machining the workpiece 2. During this operation, the electrode 1, being connected through the ball screw 8a to the Z- axis servo motor 9a, is moved up and down according to an instruction from the numerical control unit 10. As was described above, the Y-axis movable table 14b is connected through the ball screw (not shown) to the Y-axis servo motor 9b, and the X-axis movable table 14c is connected through the ball screw 8c to the X-axis servo motor 9c. These movable tables 14b and 14c are moved horizontally in response to instruction signals from the numerical control unit 10, so that the workpiece is positioned horizontally, or it is machined horizontally i.e., the workpiece 2 and the electrode 1 are moved relative to each other. Thus, by suitably controlling the operations of the servo motors 9a, 9b and 9c, a desired configuration can be formed in the workpiece at a desired position by electric discharge machining.

In the machining operation, the machining program and the machining conditions are determined by the operator according to the configurations of electrodes to be used and machining depths to be employed.

The conventional electric discharge machine thus constructed is disadvantageous in that electrical conditions must be determined separately according to the configurations of electrodes to be used, and therefore it is essential for the operator to refer to the configurations of electrodes to be used.

SUMMARY OF THE INVENTION

Accordingly, it is an object of this invention to eliminate the above-described difficulty accompanying a conventional electric discharge machine.

More specifically, it is an object of the invention to provide an electric discharge machine in which an electrode configuration sensor is used to output data on the machining areas of an electric discharge machining electrode which are necessary for an electric discharge machining operation, and electrical conditions for the electric discharge machining operation are automatically selected according to the data thus provided.

The foregoing object and other objects of the invention have been achieved by the provision of an electric discharge machine with a numerical control unit, which, according to the invention, comprises an automatic electrical condition selecting means for comparing configuration information for an electrode connected to the main shaft of the electric discharge machine with data provided as data bases in the numerical control unit, to automatically select electrical conditions most suitable for the electric discharge machining operation.

In addition, configuration information is contained in a program data or machining the electrode in the numerical control program of CAD/CAM. The configuration information of the electrode is utilized in such a manner that the most suitable machining conditions of the date bases of NC are selected.

In the electric discharge machine, the electrical machining condition data previously provided in the numerical control unit separately according to machining areas are compared with one of area data provided by the electrode configuration detecting means (electrode configuration sensor) separately according to machining depths and area data provided by the configuration information of the electrode in the numerical control program, so that most suitable machining conditions are automatically selected or switched separately according to the machining depths so as to operate the electric discharge machine.

The nature, principle and utility of the invention will become more apparent from the following detailed description when read in conjunction with the accompanying drawings, in which like parts are designated by like reference numerals.

DETAILED DESCRIPTION OF THE INVENTION

One example of an electric discharge machine according to this invention will be described with reference to FIGS. 1 through 3.

Figure 1:
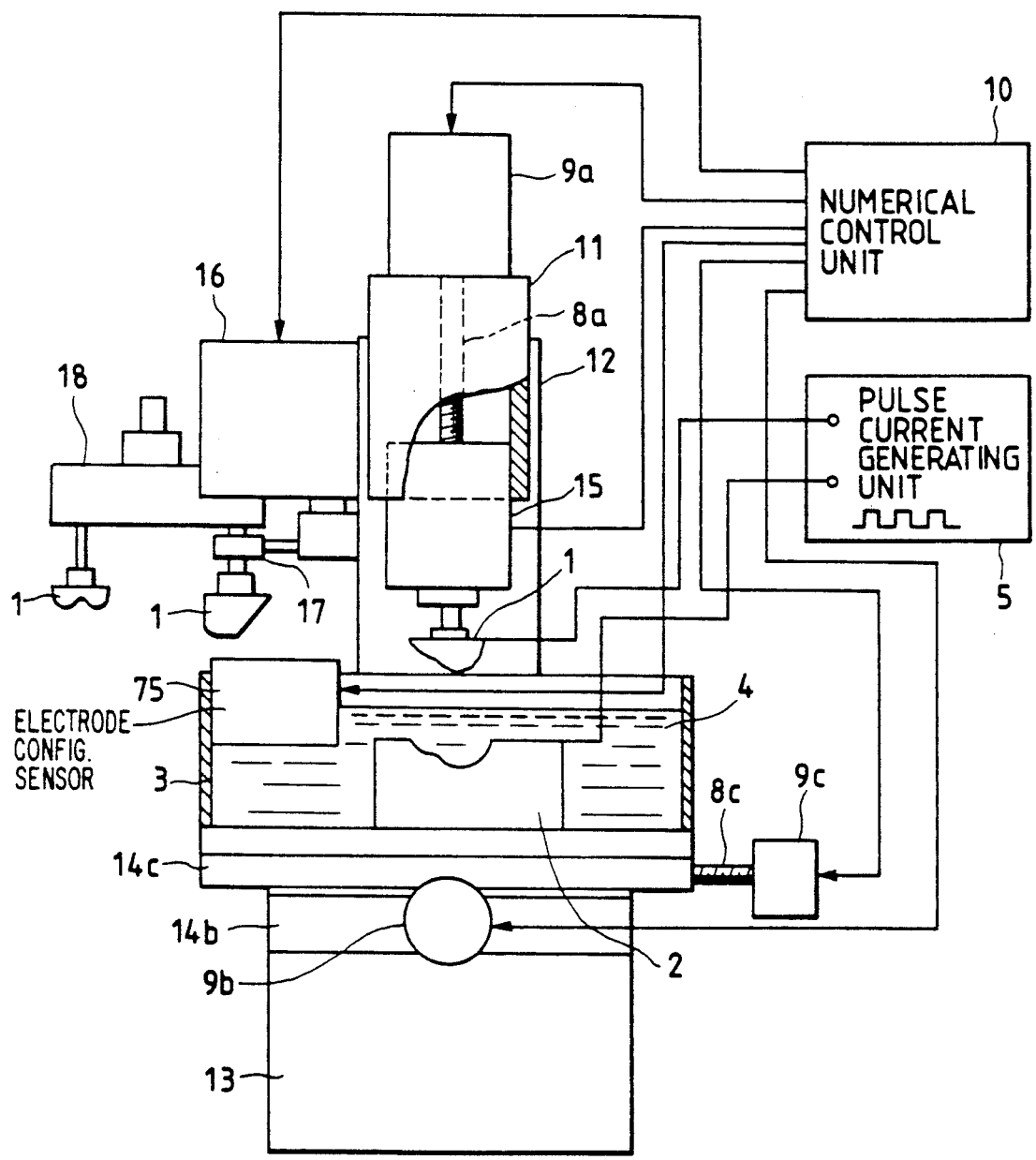
FIG. 1 is an explanatory diagram, partly as a block diagram, showing the entire arrangement of one example of an electric discharge machine according to this invention.
Figure 5:
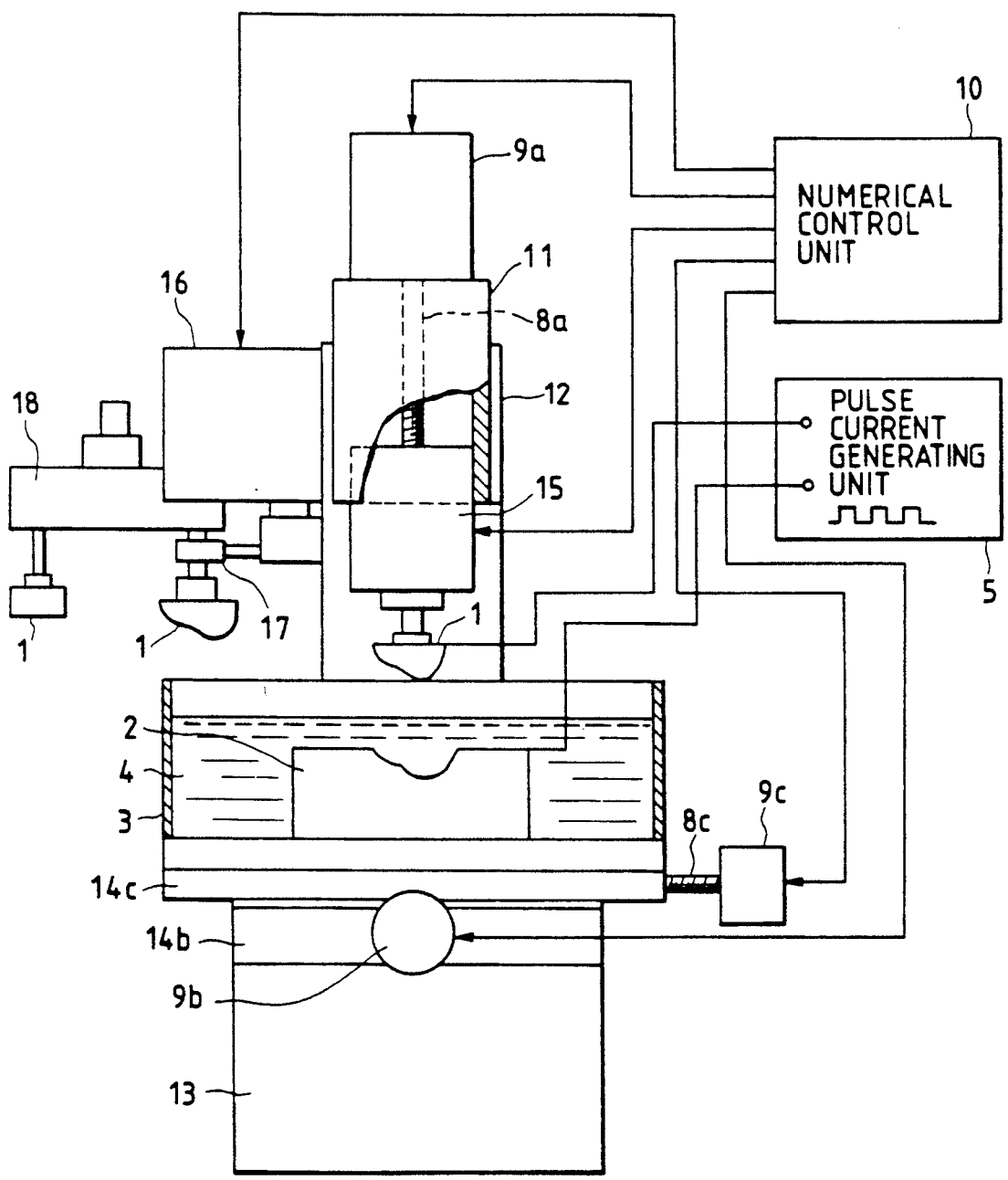
FIG. 5 is an explanatory diagram, partly as a block diagram, showing the entire arrangement of a conventional electric discharge machine.

In FIG. 1, parts corresponding functionally to those already described are designated by corresponding reference numerals or characters. More specifically, reference characters 1 through 5 and 8a through 18 designate the same items or functionally the same items as those shown in FIG. 5. Furthermore, in FIG. 1, reference numeral 75 designates an electrode configuration sensor for measuring the configuration of the machining electrode 1.

The operation of the electric discharge machine thus constructed will be described.

Figure 2A:
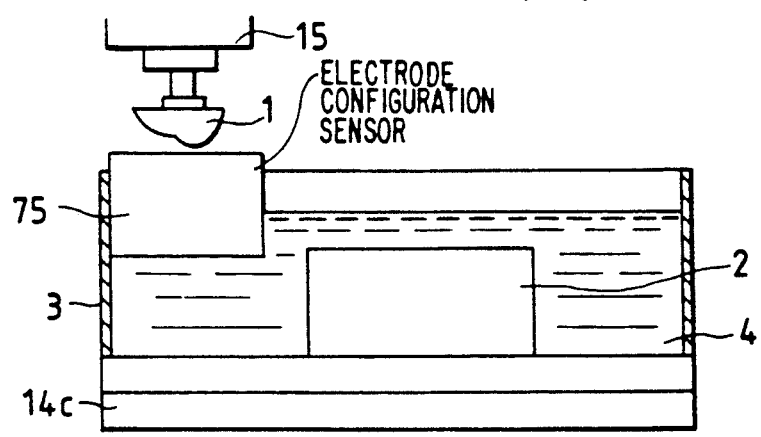
FIGS. 2(a) and 2(b) are explanatory diagrams for a description of part of an electric discharge machining operation carried out with the machine shown in FIG. 1.
Figure 2B:
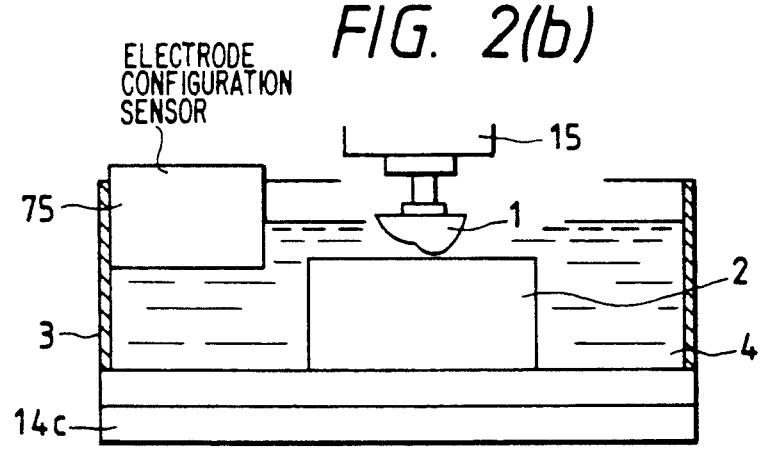

As shown in FIGS. 2(a) and 2(b), the electric discharge machining electrode 1 connected to the machining head 15 is moved towards the workpiece 2 to carry out an electric discharge machining operation. Therefore, it is necessary to detect surface areas (or machining areas) at heights (or machining depths) of the electrode 1 from its end. For this purpose, the head 15 and the electrode configuration sensor 75 are moved relative to each other so that the head 15 is located above the sensor 75, to measure the surface areas at the heights as shown in FIG. 3. More specifically, in the case of FIG. 3, surfaces areas taken along horizontal parallel lines arranged at intervals of 1 mm are measured. The surface areas thus measured are applied to the numerical control unit 10 as indicated at (a) in the following Table 1; that is, the surface areas with the lengths are input to the numerical control unit 10.

TABLE 1

| (a) | | (b) |
|---|---|---|
| Length (mm) | Surface area (cm²) | Machining condition |
| 0 | 0 | E9901 |
| 1 | 0.2 | E9901 |
| 2 | 0.6 | E9902 |
| 3 | 1.2 | E9903 |
| . | . | . |
| . | . | . |
| . | . | . |
| 28 | 48.0 | E9907 |
| 29 | 79.0 | E9908 |
| 30 | 103.0 | E9909 |

On the other hand, the numerical control unit 10 has a function of automatically selecting machining conditions from data bases; that is, it has machining condition packs (hereinafter referred to as "E packs", when applicable) separately according to the materials of the electrodes 1 and workpieces 2 with respect to the surface areas. In the numerical control unit 10, the surface areas of the electrode 1 at the heights, which are furnished by the electrode configuration sensor 75, are compared with the data bases as shown in the following Table 2, so that machining conditions for the machining depths are determined as indicated at (b) in Table 1.

TABLE 2

| Surface area | | Copper:steel | Graphite:steel | ... |
|---|---|---|---|---|
| More than | 0 cm² | E9901 | E9911 | . |
| | 0.5 | E9902 | E9912 | . |
| | 1.0 | E9903 | E9913 | . |
| | 2.0 | E9904 | E9914 | . |
| | 5.0 | E9905 | E9915 | . |
| | 10.0 | E9906 | E9916 | . |
| | 20.0 | E9907 | E9917 | . |
| | 50.0 | E9908 | E9918 | . |
| | 100.0 | E9909 | E9919 | . |

Note — "Copper:steel" etc. denotes "electrode material:workpiece material".

Thereafter, the movable tables 14b and 14c are moved, and the following machining step; i.e., an electric discharge machining step is carried out. Although only machining depth sets are given, machining conditions (called "E packs") are automatically selected separately according to the machining depths, to carry out the electric discharge machining operation.

The other example of an electric discharge machine according to this invention will be described with reference to FIG. 4.

Figure 4:
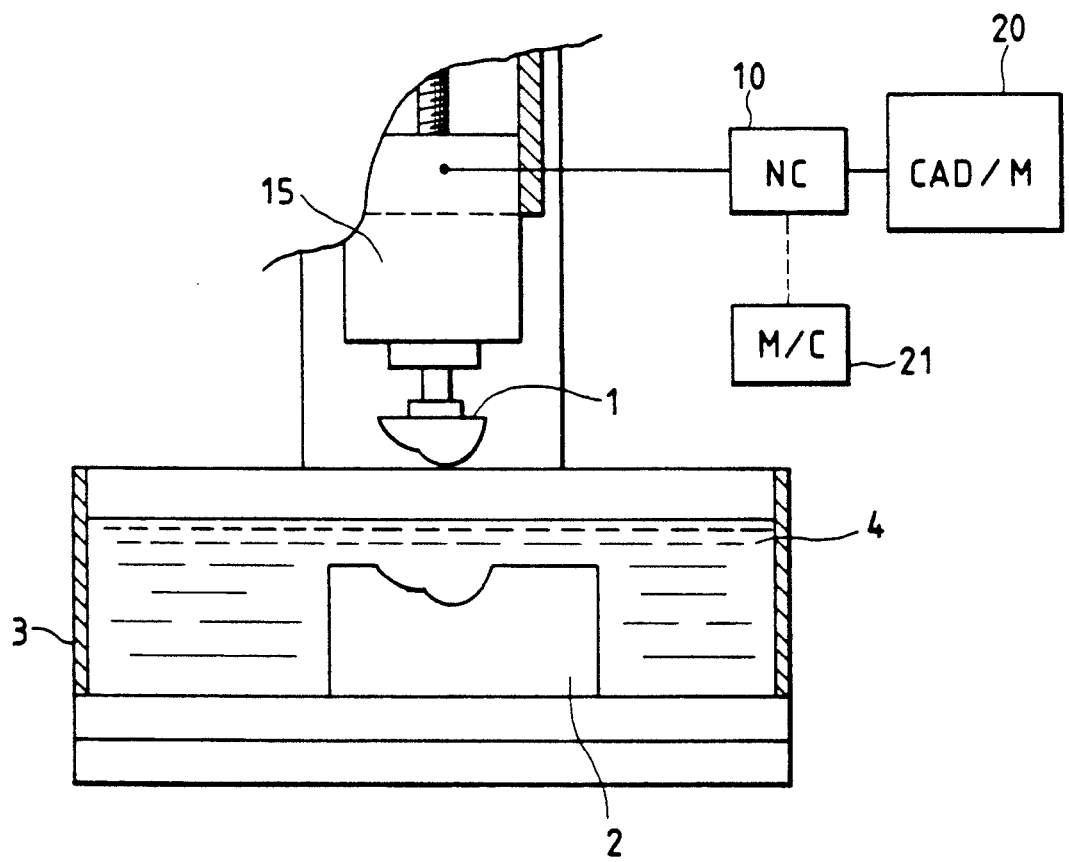
FIG. 4 is an explanatory diagram for a description of part of the other example of an electric discharge machine according to this invention.

FIG. 4 is an explanatory diagram for a description of part of the other example of an electric discharge machine according to this invention.

In FIG. 4, a reference numeral 20 designates a CAD/CAM device and a reference numeral 21 designates a electrode machining device. The CAD/CAM device is provided with a numerical control program containing configuration information for machining the electrode 1. The numerical control program is output to the numerical control unit 10 so that the electrode 1 is machined by the electrode machining device 21.

Figure 3:
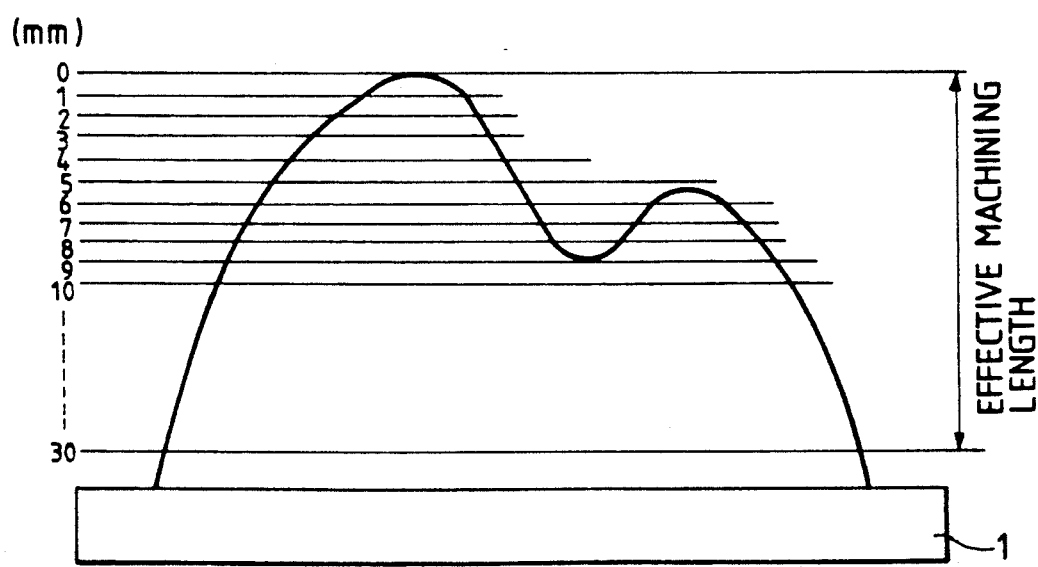
FIG. 3 is an explanatory diagram for a description of the operation o electrode configuration sensor provided for the electric discharge machine according to the invention.

At this time, information regarding surface areas taken along horizontal parallel lines arranged at intervals of 1 mm of the electrode 1, which is three-dimensional shaped as shown in FIG. 3, is indicated at (a) in the Table 1 as well as the previous description. The information of surfaces areas at each of the heights transmitted to the CAD/CAM 20 is compared with the data bases of the numerical control unit 10, so that the most suitable machining condition of the electrode 1 is determined separately according to the machining depths of the workpiece 2, as indicated at (b) in the Table 1.

As a result, in the case of the machining in which information of the machining depth of the electric discharge machining operation is predetermined as well as the machining shown in FIG. 1, the most suitable machining conditions (called "E packs") are automatically and separately selected according to the machining depths selected to carry out the electric discharge machining operation.

In the above-described embodiments, the electrode areas provided respectively for the machining depths are utilized; however, for simplicity, sectional areas may be employed.

With the electric discharge machine according to the invention, the electrode configuration sensor provided in the machining vessel so as to detect the configuration of the electrode or an electrode configuration information of the numerical control program is utilized for automatically selecting the most suitable machining condition for the electric discharge machining operation that is carried out with the electrode whose configuration has been thus detected.

Hence, the electric discharge machine, unlike the conventional electric discharge machine, is free from the troublesome operation of setting electrical conditions. Furthermore, since the electric discharge machining operation is carried Out while electrical conditions most suitable for machining areas are automatically selected, the machining time can be reduced by a large amount. In addition, with the electric discharge machine of the invention, even a person not skilled in the art can perform an electric discharge machining operation.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In an electric discharge machine with a numerical control unit and having an electrode connected to a main shaft, the improvement comprising:

automatic electrical condition selecting means including means for comparing configuration information for said electrode connected to the main shaft of the electric discharge machine with electrical condition data provided as databases in said numerical control unit and means to automatically select, based on said comparison, electrical conditions most suitable for an electrical discharge machining operation, and electrode configuration detecting means for detecting the configuration of said electrode connected to the main shaft of said electric discharge machine before said electric discharge machining operation is performed in such a manner that information thus detected is utilized as said configuration information to be compared, said detecting means measuring surface areas of said electrode with respect to a plurality of distances from one end of the electrode.

2. An electric discharge machine with a numerical control unit according to claim 1, in which said surface areas taken along horizontal parallel lines located at corresponding ones of said distances and arranged at intervals of 1 mm are measured.

3. An electric discharge machine with a numerical control unit according to claim 2, in which surface areas thus measured are input to said numerical control unit in such a manner that the surface areas of said electrode for each of said distances are compared with the databases, whereby said condition selecting means selects said electrical conditions most suitable for said electric discharge machining operation.

4. An electric discharge machine with a numerical control unit according to claim 1, wherein said configuration information of the electrode is contained in data in a numerical control program of a CAD/CAM device for machining the electrode.

* * * * *